US010743226B2

(12) United States Patent
Cizdziel et al.

(10) Patent No.: US 10,743,226 B2
(45) Date of Patent: Aug. 11, 2020

(54) RADAR SHIELD CLIENT ASSURANCE IN WIRELESS NETWORKS

(71) Applicant: Cisco Technology, Inc., San Jose, CA (US)

(72) Inventors: Benjamin Jacob Cizdziel, San Jose, CA (US); Vishal Satyendra Desai, San Jose, CA (US); Santosh Kulkarni, San Jose, CA (US); Young Il Choi, San Jose, CA (US); Nafi Ur Rashid, Santa Clara, CA (US); Leela Venkata Kiran Kumar Reddy Chirala, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 171 days.

(21) Appl. No.: 15/891,488

(22) Filed: Feb. 8, 2018

(65) Prior Publication Data
US 2019/0246324 A1 Aug. 8, 2019

(51) Int. Cl.
*H04W 36/06* (2009.01)
*H04W 36/00* (2009.01)
*H04W 24/08* (2009.01)
*H04W 36/30* (2009.01)
*H04W 16/14* (2009.01)
*H04W 72/04* (2009.01)
*H04W 84/12* (2009.01)

(52) U.S. Cl.
CPC .......... *H04W 36/06* (2013.01); *H04W 16/14* (2013.01); *H04W 24/08* (2013.01); *H04W 36/0088* (2013.01); *H04W 36/30* (2013.01); *H04W 72/0453* (2013.01); *H04W 84/12* (2013.01)

(58) Field of Classification Search
None
See application file for complete search history.

(56) References Cited

U.S. PATENT DOCUMENTS

| 7,424,268 | B2 | 9/2008 | Diener et al. |
| 9,119,079 | B2 | 8/2015 | Soyak et al. |
| 9,585,143 | B2 | 2/2017 | Tang et al. |
| 9,622,089 | B1 | 4/2017 | Ngo et al. |
| 2017/0026845 | A1* | 1/2017 | Garg ..................... H04W 16/10 |
| 2017/0150368 | A1* | 5/2017 | Ngo ........................ H04K 3/00 |
| 2017/0208474 | A1 | 7/2017 | Mody et al. |
| 2018/0199342 | A1* | 7/2018 | Rai ......................... G01S 7/021 |
| 2018/0284735 | A1* | 10/2018 | Cella .................... G05B 23/024 |
| 2020/0015091 | A1* | 1/2020 | Taskin .............. H04W 72/0426 |

OTHER PUBLICATIONS

Jennifer Jabbusch "Dynamic Frequency Selection Part 3: The Channel Dilemma" | Network . . . https://www.networkcomputing.com/wireless/dynamic-frequency-selecti . . . ; Oct. 17, 2013; pp. 1-8.
David Kloper "Faster Signaling of Dynamic Frequency Selection (DFS) to Clients" Copyright 2015 Cisco Systems, Inc.; pp. 1-5.

* cited by examiner

*Primary Examiner* — Rebecca E Song
(74) *Attorney, Agent, or Firm* — Behmke Innovation Group LLC; Kenneth J. Heywood; Jonathon P. Western

(57) ABSTRACT

In one embodiment, a service receives radar data regarding usage of one or more wireless channels by a radar. The service populates a database of radar features with the received radar data. The service trains, using the database of radar features, a machine learning-based model to predict channel usages by the radar. The service causes a wireless access point to change to a different wireless channel, based on the predicted channel usages by the radar.

15 Claims, 12 Drawing Sheets

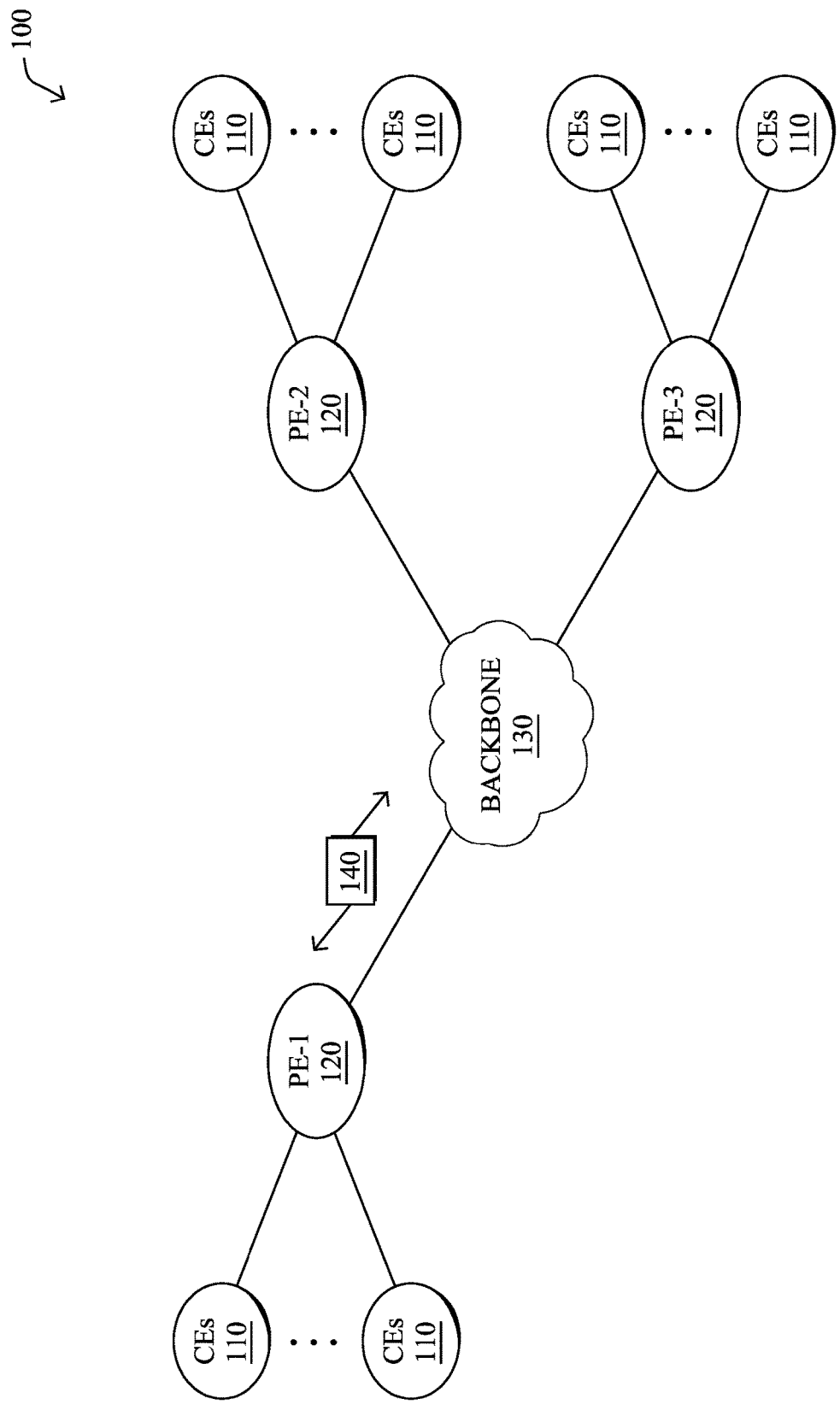

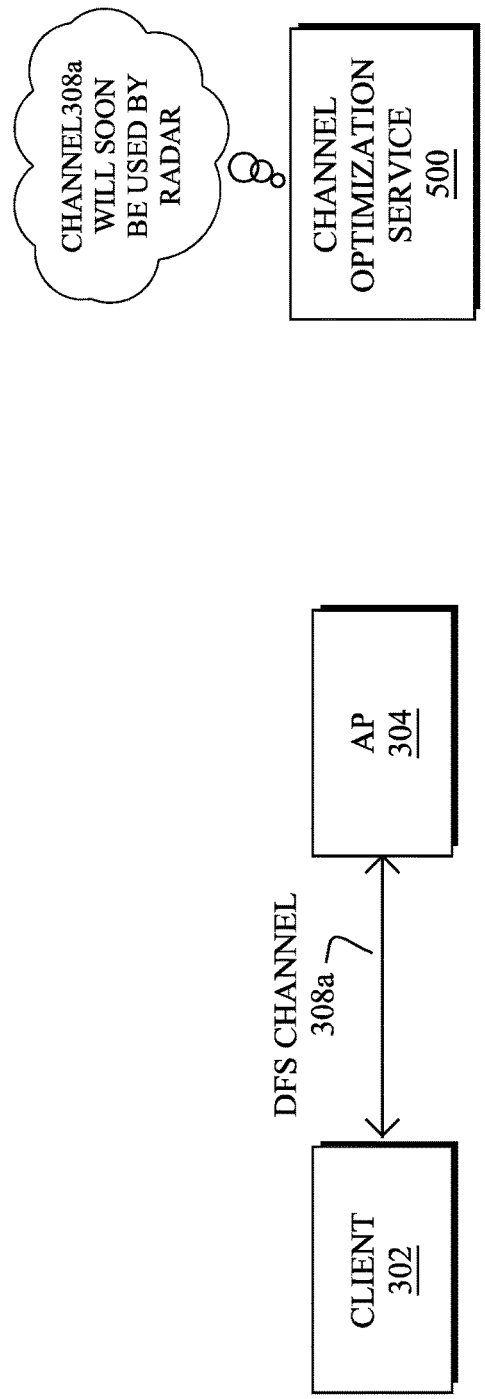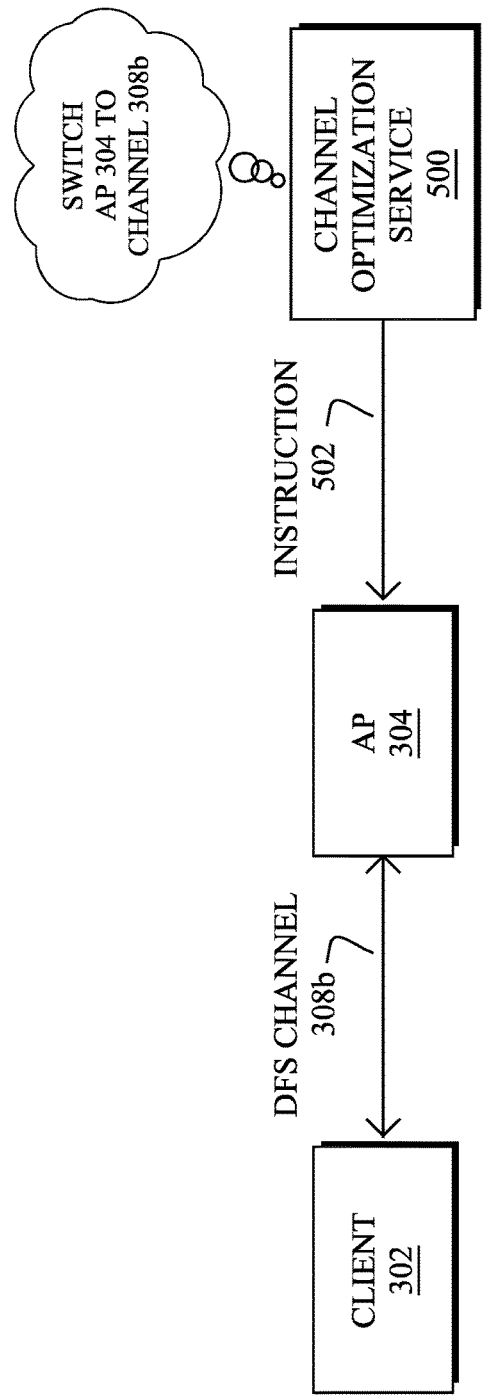

RADAR SHIELD CLIENT ASSURANCE IN WIRELESS NETWORKS

TECHNICAL FIELD

The present disclosure relates generally to computer networks, and, more particularly, to radar shield client assurance in wireless networks.

BACKGROUND

As wireless devices become more and more prevalent, channel congestion is also rapidly increasing. Notably, many countries allow different types of devices to use the same frequency band. For example, in the United States of America, the 2.4 GHz band is shared by Wi-Fi devices, cordless phones, baby monitors, garage door openers, and the like. In more recent times, Wi-Fi has expanded to the 5 GHz band, portions of which have been used for years for radar applications, such as weather radars, naval radars, etc. While typically less congested than the 2.4 GHz band, radar usage of the 5 GHz band still presents a potential cause for congestion to Wi-Fi devices.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 1A-1B illustrate an example communication network;

FIGS. 5A-5F illustrate examples of an access point using the techniques herein;

DESCRIPTION OF EXAMPLE EMBODIMENTS

Overview

Figure 1B:
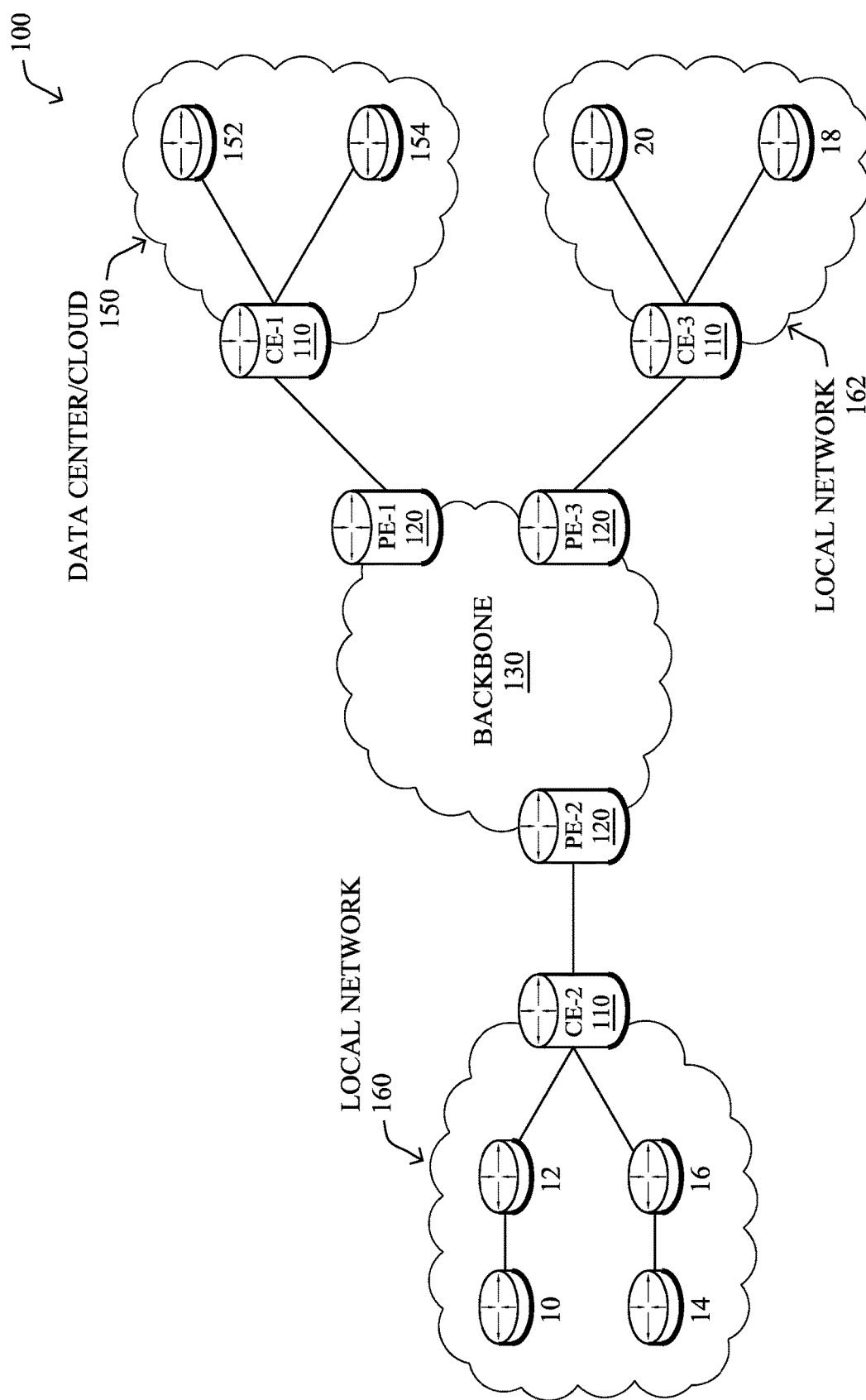

According to one or more embodiments of the disclosure, a service receives radar data regarding usage of one or more wireless channels by a radar. The service populates a database of radar features with the received radar data. The service trains, using the database of radar features, a machine learning-based model to predict channel usages by the radar. The service causes a wireless access point to change to a different wireless channel, based on the predicted channel usages by the radar.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others.

The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may further be interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless networks. That is, in addition to one or more sensors, each sensor device (node) in a sensor network may generally be equipped with a radio transceiver or other communication port, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3 in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN, thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different service providers), with potentially a backup link (e.g., a 3G/4G/LTE connection). A site of type B may itself be of different types:

2a.) Site Type B1: a site connected to the network using two MPLS VPN links (e.g., from different service providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

FIG. 1B illustrates an example of network 100 in greater detail, according to various embodiments. As shown, network backbone 130 may provide connectivity between devices located in different geographical areas and/or different types of local networks. For example, network 100 may comprise local networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

The techniques herein may also be applied to other network topologies and configurations. For example, the techniques herein may be applied to peering points with high-speed links, data centers, etc. Further, in various embodiments, network 100 may include one or more mesh networks, such as an Internet of Things network. Loosely, the term "Internet of Things" or "IoT" refers to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, etc., are often on what is referred to as Low-Power and Lossy Networks (LLNs), which are a class of network in which both the routers and their interconnect are constrained. In particular, LLN routers typically operate with highly constrained resources, e.g., processing power, memory, and/or energy (battery), and their interconnections are characterized by, illustratively, high loss rates, low data rates, and/or instability. LLNs are comprised of anything from a few dozen to thousands or even millions of LLN routers, and support point-to-point traffic (e.g., between devices inside the LLN), point-to-multipoint traffic (e.g., from a central control point such at the root node to a subset of devices inside the LLN), and multipoint-to-point traffic (e.g., from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

Figure 2:
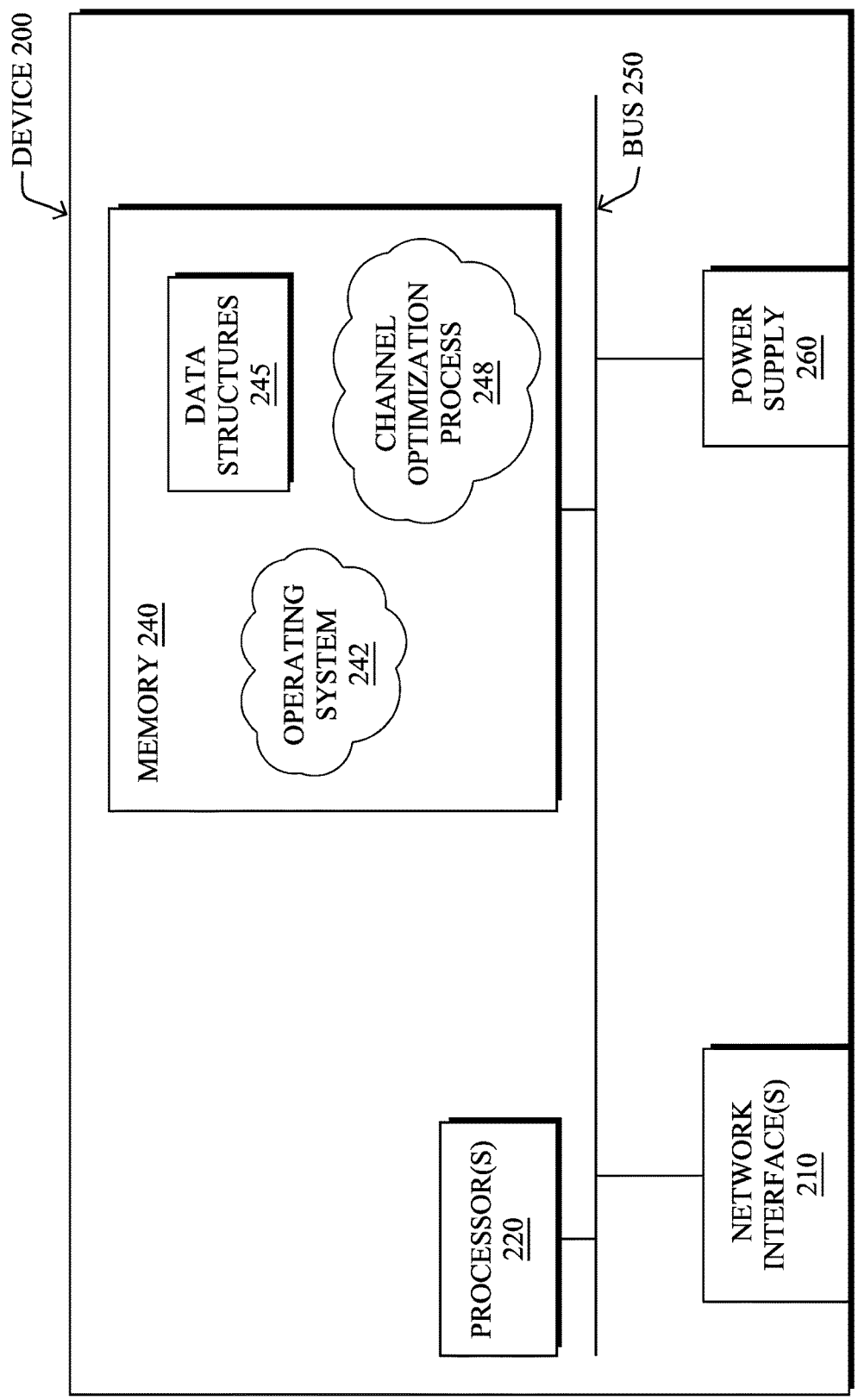
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processes and/or services executing on the device. These software processes and/or services may comprise a channel optimization process 248.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, channel optimization process 248 may execute one or more machine learning-based classifiers to optimize channel usage by one or more wireless access points in a network. Notably, as detailed below, channel optimization process 248 may employ any number of machine learning techniques, to implement the channel optimization techniques herein. In general, machine learning is concerned with the design and the development of techniques that receive empirical data as input (e.g., data regarding wireless channel usage) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function is a function of the number of misclassified points. The learning process then operates by adjusting the parameters a,b,c such that the number of misclassified points is minimal. After this optimization/learning phase, channel optimization process 248 can use the model M to classify new data points, such as potential channel usages in the network. Often, M is a statistical model, and the cost function is inversely proportional to the likelihood of M, given the input data.

In various embodiments, channel optimization process 248 may employ one or more supervised, unsupervised, or semi-supervised machine learning models. Generally, supervised learning entails the use of a training set of data, as noted above, that is used to train the model to apply labels to the input data. For example, the training data may include sample data that is "normal," or "malware-generated." On the other end of the spectrum are unsupervised techniques that do not require a training set of labels. Notably, while a supervised learning model may look for previously seen patterns that have been labeled as such, an unsupervised model may instead look to whether there are sudden changes in the behavior of the system. Semi-supervised learning models take a middle ground approach that uses a greatly reduced set of labeled training data.

Example machine learning techniques that channel optimization process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

Figure 3A:
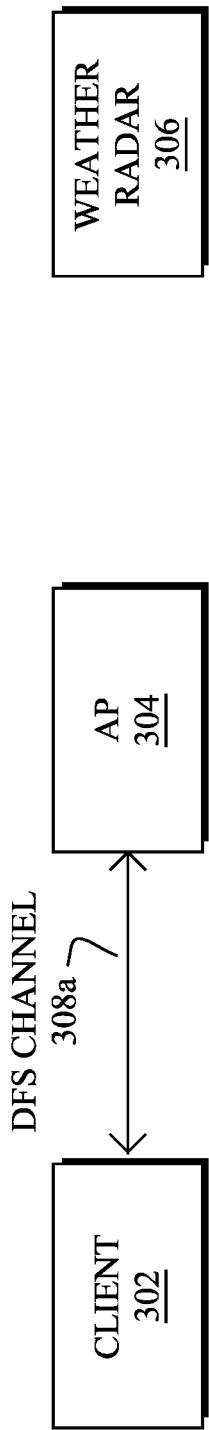
FIGS. 3A-3D illustrate an example of a radar using a wireless channel.
Figure 3B:
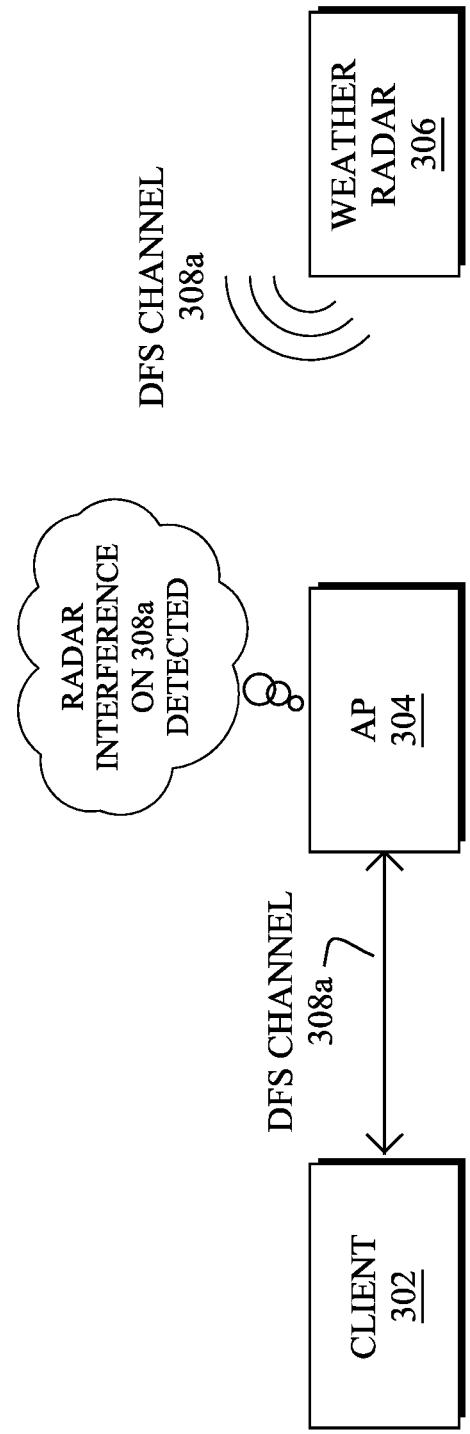

As noted above, in many countries, a significant portion of the Wi-Fi spectrum is now shared with radar, which can cause collisions when radar is using the same channel as that of a Wi-Fi device. An example of this situation is illustrated in FIGS. 3A-3D. As shown in FIG. 3A, assume that a client 302 is attached to a wireless access point (AP) 304, such as part of a local network. In various examples, client 302 may be a mobile device, such as a tablet, laptop, phone, or the like. In further examples, client 302 may be a stationary device, such as a set-top box, desktop computer, camera, or any other form of device that can communicate wirelessly with a local network.

As would be appreciated, AP 304 may be any form of device configured to provide wireless network connectivity to one or more client devices, such as client 302. In various embodiments, AP 304 may be a Wi-Fi AP, such as an 802.11n or 802.11ac AP. In some cases, AP 304 may be a dual band or even tri-band AP that can communicate on the 2.4 GHz and/or 5 GHz Wi-Fi bands. To provide network connectivity to client 302, AP 304 may be connected to any number of switches, routers, or other networking equipment in its local network. In some cases, these functions can also be integrated into AP 304, directly (e.g., a home router that also functions as a wireless AP). To oversee AP 304, the network may also include one or more supervisory services or devices, such as a wireless LAN controller (WLC), that controls or adjusts the operation of AP 304.

To communicate with client 302, AP 304 may use a first, selected wireless channel 308a from among a pool of defined Wi-Fi channels. However, as noted, weather radar 306, or other forms of radar, may also make use of that same channel, at some point in time. Thus, weather radar 306 represents a potential source of congestion on channel 308a and a potential interferer with the communications between client 302 and AP 304.

Due in part to the sharing of the 5 GHz band by radar and Wi-Fi in many countries, dynamic frequency selection (DFS) was added to the Institute of Electrical and Electronics Engineers (IEEE) 802.11 standard. With DFS, certain Wi-Fi channels are designated as DFS channels. For purposes of illustration, assume that channel 308a is such a DFS channel. For example, in the United States of America, 5 GHz Wi-Fi channels include the following:

TABLE 1

| Wi-Fi Channel | DFS Channel? |
| --- | --- |
| 36 | No |
| 40 | No |
| 44 | No |
| 48 | No |
| 52 | Yes |
| 56 | Yes |
| 60 | Yes |
| 64 | Yes |
| . . . | . . . |
| 100 | Yes |
| 104 | Yes |
| 108 | Yes |
| 112 | Yes |

TABLE 1-continued

| Wi-Fi Channel | DFS Channel? |
|---|---|
| 116 | Yes |
| 120 | Yes |
| 124 | Yes |
| 128 | Yes |
| 132 | Yes |
| 136 | Yes |
| 140 | Yes |
| ... | ... |

As would be appreciated, which Wi-Fi channels are designated as DFS channels may vary by jurisdiction. For example, in the United States of America, DFS is required for Wi-Fi channels that fall between 5.250-5.330 GHz, which is the upper edge of channel 64, and 5.490-5.730 GHz, which is the upper edge of channel 144. Brazil, in contrast, only requires DFS for Wi-Fi channels in the 5.470-5.725 GHz range.

In general, when a Wi-Fi AP is on a DFS channel and detects a radar signal on that channel, it must vacate that channel and move to a new channel within a few seconds. For example, assume in FIG. 3B that weather radar 306 begins using DFS channel 308a at the same time that AP 304 is using DFS channel 308a to communicate with client 302. In such a case, AP 304 may detect the usage of DFS channel 308a by weather radar 306 and initiate a channel changeover. This forced changeover results in an immediate service interruption to any clients served by the AP, as the clients must also change channels, to continue their wireless connection to the AP. For clarity, note that AP 304 does not need to be communicating (e.g., transmitting) on DFS channel 308a, to detect usage of the channel by weather radar 306.

Figure 3C:
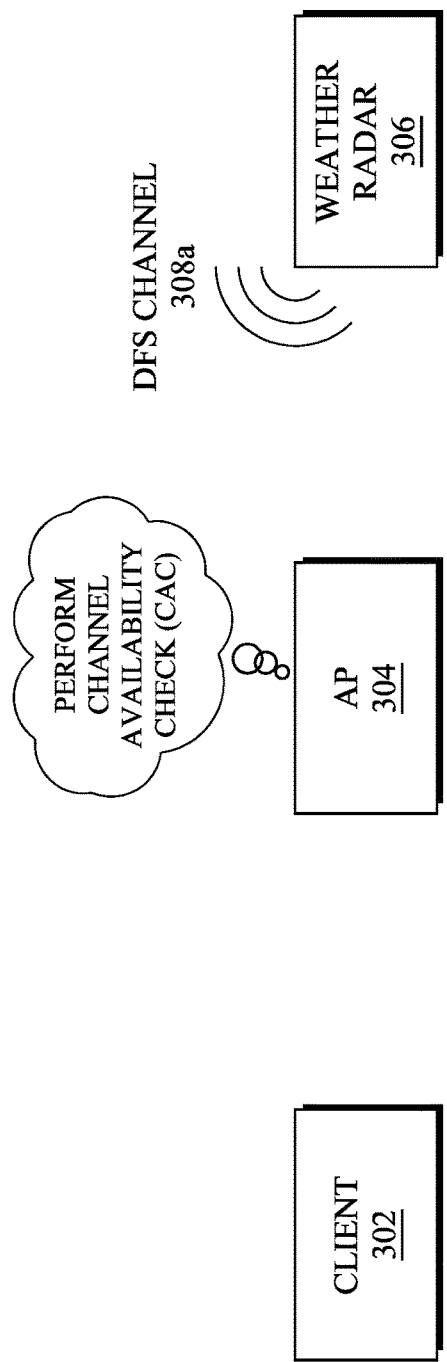

Another requirement of DFS is the channel availability check (CAC), which mandates that a Wi-Fi AP whose radio switches to a DFS channel must first listen on the channel for the presence of radar signals for a period of time before it can resume transmission. This CAC period ranges from 60 seconds to 600 seconds, depending on the channel and regulatory domain. During the CAC period, the radio of an AP must operate in a receive-only mode and, thus, is unable to serve its client devices. For example, as shown in FIG. 3C, assume that AP 304 has stopped using DFS channel 308a and is attempting to switch to another DFS channel. While the CAC is being performed, client 302 may lose connectivity with AP 304, causing client 302 to roam to another AP during this delay period. Some areas of Wi-Fi services, such as medical, transportation, military, and security, which have a zero-tolerance policy, cannot use DFS channels at all because of this service disruption.

Figure 3D:
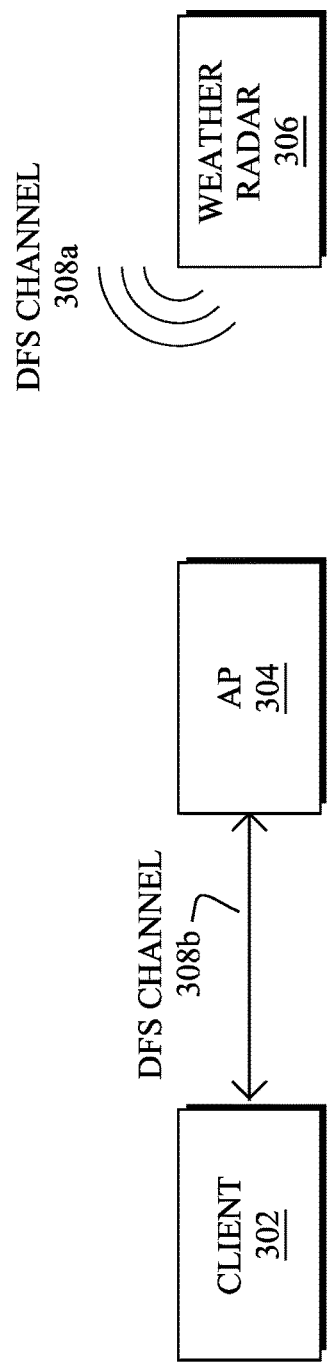

Assuming that the CAC performed by AP 304 indicates that the selected DFS channel 308b is clear from use by radar, AP 304 may switch to DFS channel 308b and resume communications with client 302 (e.g., by forcing client 302 to move to the new channel), as shown in FIG. 3D. However, during the performance of the CAC, it is also possible that client 302 may instead attach to a different AP with a suboptimal received signal strength indicator (RSSI), also potentially leading to an asymmetric load within the local network.

Today, a significant portion (greater than 75%, in some areas) of the available 5 GHz frequency bands for Wi-Fi employs DFS. With CAC times mandated at up to ten minutes in some regulatory domains, detection of a radar pulse on DFS channels commonly leads to severe service disruption for wireless users. Despite this risk, service providers continue to enable DFS on wireless networks, as it helps increase channel availability, reduce spectrum overlap, increase air time efficiency and improve overall network capacity. Notably, with proliferation of 802.11ac Wave 1 and Wave 2 devices that operate on 80 MHz and 160 MHz, respectively, Wi-Fi service operation on DFS frequencies is absolutely essential to cater to the needs of high capacity devices in a wireless network. But because of the above issues, providing uninterrupted wireless service in the presence of radars on 5 GHz spectrum can be challenging.

Being able to accurately predict impending radar pulses on a given DFS channel would give the Wi-Fi access points time to intervene and move to a "radar-free" channel, minimizing CACs, improving overall network connectivity, quality of service and end user experience. Such predictions would enable or facilitate numerous potential applications of benefit to service providers, including: (a) alerts warning of immediately impending radar events; (b) recommendations of interventions to prevent problems; and (c) enhanced individual network configurations that could help administrators manage their wireless deployments.

Radar Shield Client Assurance in Wireless Networks

The techniques introduced herein are able to prevent, or at least greatly reduce, the presence of DFS-related service interruptions in Wi-Fi networks. In some aspects, the techniques herein may leverage machine learning, to generate a model that is able to make radar interference predictions with respect to the DFS channels. In turn, these predictions can be used proactively to cause an AP to switch channels before actual usage of the channel by a radar system, while avoiding DFS channel change service downtime. In other cases, if an AP detects radar usage on its current DFS channel, the predicted channel usages from the machine learning-based model can be used to aid in the selection of, and to mitigate the service impact from switching to, a new channel for the AP that is predicted to be clear from radar use, at least for a period of time. It should be noted that these mechanisms may also benefit radar systems in the vicinity by reducing the likelihood of interference upon them by Wi-Fi networks.

Specifically, according to one or more embodiments of the disclosure as described in detail below, a service receives radar data regarding usage of one or more wireless channels by a radar. The service populates a database of radar features with the received radar data. The service trains, using the database of radar features, a machine learning-based model to predict channel usages by the radar. The service causes a wireless access point to change to a different wireless channel, based on the predicted channel usages by the radar.

Illustratively, the techniques described herein may be performed by hardware, software, and/or firmware, such as in accordance with the channel optimization process 248, which may include computer executable instructions executed by the processor 220 (or independent processor of interfaces 210) to perform functions relating to the techniques described herein.

Figure 4:
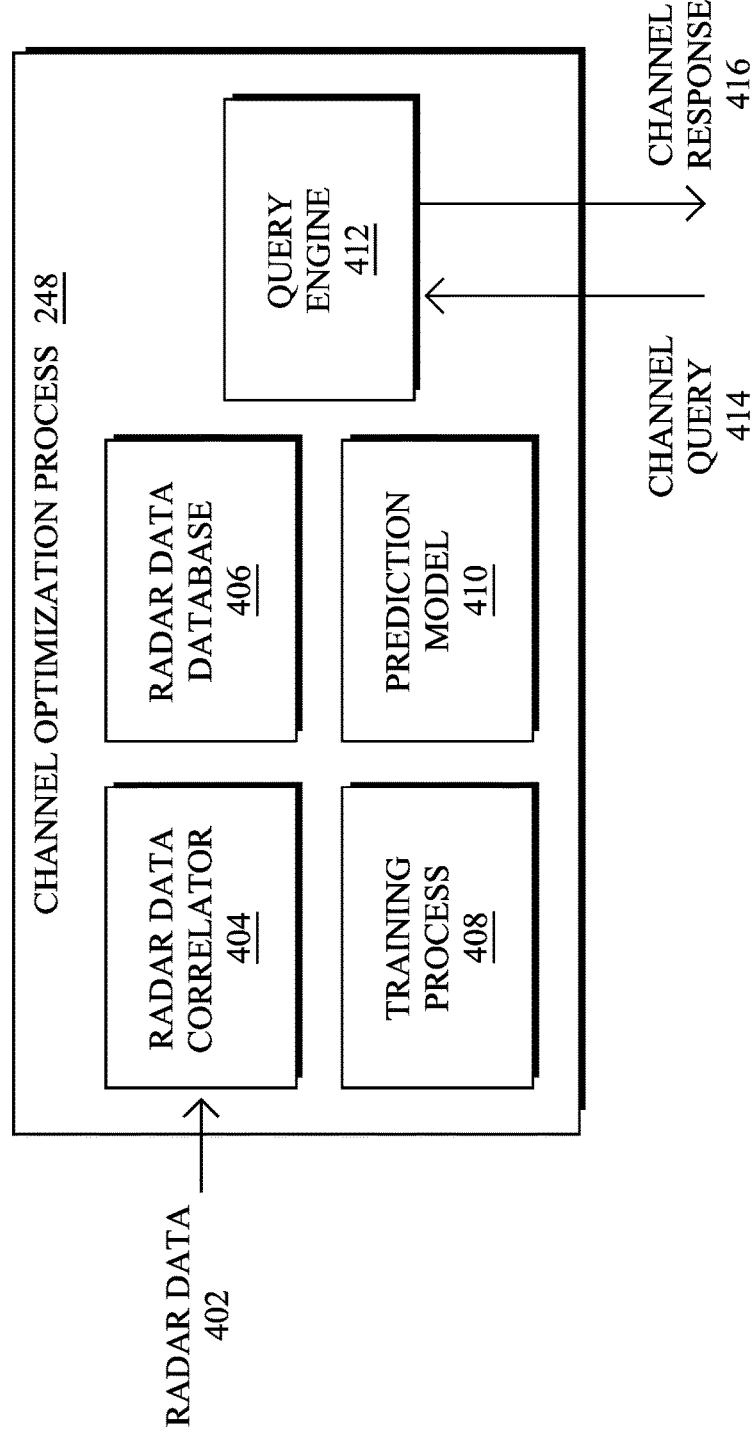
FIG. 4 illustrates an example architecture for implementing radar shield client assurance.

Operationally, FIG. 4 illustrates an example architecture 400 for implementing radar shield client assurance, according to various embodiments. As shown, channel optimization process 248 may include any number of sub-processes and/or memory locations, such as the components 404-412 shown. Further, the components of architecture 400 may be implemented in a distributed manner or implemented as its own stand-alone service, either as part of the local network under observation or as a remote service. For example, in various embodiments, channel optimization process 248 may be implemented on the AP itself, on a WLC that oversees the operation of one or more APs, or on another supervisory device. In addition, the functionalities of the components 404-414 of architecture 400 may be combined, omitted, or implemented as part of other processes, as desired.

During operation, channel optimization process 248 may receive radar data 402 from any number of disparate sources, such as a plurality of APs situated at different geographic locations. In general, radar data 402 may include information regarding any usage of the DFS channels by a radar. In the case of APs, such detection of radar usage in the 5 GHz frequency band may occur while the AP is currently servicing clients on a particular DFS channel or, alternatively, while a radio of the AP is operating in monitor/receive only mode.

Example data that radar data 402 may include can include, but is not limited to, any or all of the following:
  The channel on which the radar usage was detected.
  The time(s) and/or date(s) at which the usage of the channel by the radar occurred or was detected.
  The identity of the device that detected the channel usage by the radar.
  The location of the device that detected the channel usage by the radar.
  Weather information for the location at which the channel usage by the radar was detected.
  A radar detection confidence factor that quantifies the confidence that radar usage of the channel was actually observed.
  Data regarding a non-occupancy period of time during which the DFS channel was not in use by the radar.

In various embodiments, channel optimization process 248 may include a radar data correlator 404 configured to correlate and assess the radar data 402 from different sources. Since radars typically have an operating range of tens to hundreds of miles, multiple access points that are in the same radio frequency (RF) neighborhood are likely to detect the same interfering radar. Accordingly, radar data correlator 404 may compare any detected channel usages by radar, both locationally and temporally, across different detectors, to ensure that the detection by one AP or other detector is corroborated. Said differently, by comparing the reported radar data 402 from a first detector to the reported radar data 402 (or lack thereof) from one or more other detectors in the area, radar data correlator 404 may determine whether the detection by the first detector is potentially a false positive. If so, radar data correlator 404 can use this property to eliminate false positives and outliers with low radar detection confidence factors.

In some embodiments, channel optimization process 248 may construct and maintain a radar data database 406 that stores the radar features reported in radar data 402 (e.g., channel, location and/or time of detection, etc.). In the case in which radar data correlator 404 determines that a reported detection in radar data 402 was a false positive, this reported detection may be excluded from storage in radar data database 406. In addition, radar data correlator 404 may issue an alert regarding the false positive or if the number of false positives from a given detector/AP is above a threshold amount.

As noted previously, channel optimization process 248 may leverage machine learning, to train a prediction model 410 to predict when radar is expected to use a given DFS channel. In particular, in various embodiments, channel optimization process 248 may include a training process 408 configured to use the data stored in radar data database 406 to train the prediction model 410. Since the goal of prediction model 410 is to predict the presence or absence of radar usage on a wireless channel based on the features in radar data database 406, the nature of the response variable is qualitative, thus making the prediction a classification problem.

More specifically, training process 408 may use at least a portion of the entries in radar data database 406 to train the machine learning-based classifier/prediction model 410. In addition, training process 408 may also conduct goodness-of-fit tests, to fine tune classifier adequacy, as well as validate classifier accuracy on data not used for calibrating the model. Note that in the base case, only the channel usage by radar and time need be predicted by prediction model 410. However, by employing additional features as well, prediction model 410 can also make more complex predictions about the channel usages by the radar. For example, training process 408 may use the entries in radar data database 406 to train model 410 to perceive patterns in radar events from radars like Terminal Doppler Weather Radars (TDWR), whose scan frequency usually depends on the amount of precipitation present in the atmosphere.

Also as shown, channel optimization process 248 may include a query engine 412 configured to provide the predictions from prediction model 410 to other systems or processes. For example, in the case of channel optimization process 248 being implemented as a stand-alone service, a WLC or AP may send a channel query 414 to query engine 412, to indicate the current or potential use of a particular wireless channel by the AP. Such a channel query 414 may, in some cases, be represented as a vector of features that correspond to the training features on which predictive model 410 was trained (e.g., location, time, weather information, etc.). In response, query engine 412 may respond with a query response 416 that indicates whether radar usage of the particular channel is predicted and, if so, when.

Note that while query engine 412 is shown to operate in a "pull" manner, it may also be configured to "push" predictions, even when a channel query 414 is not first received. For example, query engine 412 may be configured to proactively notify a WLC or AP of an upcoming usage of a wireless channel by a radar, based on the predictions from prediction model 410.

A prototype of architecture 400 was constructed and two classifiers were trained, one based on logistic regression, and the other based on K-nearest neighbor classification. These were fit to the radar features collected from a simulated network and recorded in a database. In addition, for each input data point, cross-validation estimates were generated using K-Folds and the mean accuracy on the data and labels was computed. Based on the preliminary results, the K-nearest neighbor-based classifier was found to have a much higher mean accuracy (80%) when compared to the logistic regression-based classifier (32%).

FIGS. 5A-5F illustrate examples of an access point using the techniques herein. In some embodiments, the techniques herein may be used to schedule AP channel changes, to avoid radar interference, proactively. In particular, if radar usage of a particular channel is predicted to occur, the system can proactively control one or more APs to vacate that channel before the predicted occurrence.

For example, as shown in FIG. 5A, assume that channel optimization service 500 which implements architecture 400 is in communication with AP 304 from the example previous shown in FIGS. 3A-3D. Service 500 may be executed, in various cases, on AP 304 itself, on a WLC that supervises AP 304, or by another device in communication with AP 304. Based on the received radar data at service 500, service 500 may predict that channel 308*a*, currently in use by AP 304 to communicate with client 302, is soon going to experience radar interference. In such a case, service 500 may control AP 304 to proactively switch to a different channel by sending an instruction 502 to AP 304.

Figure 6:
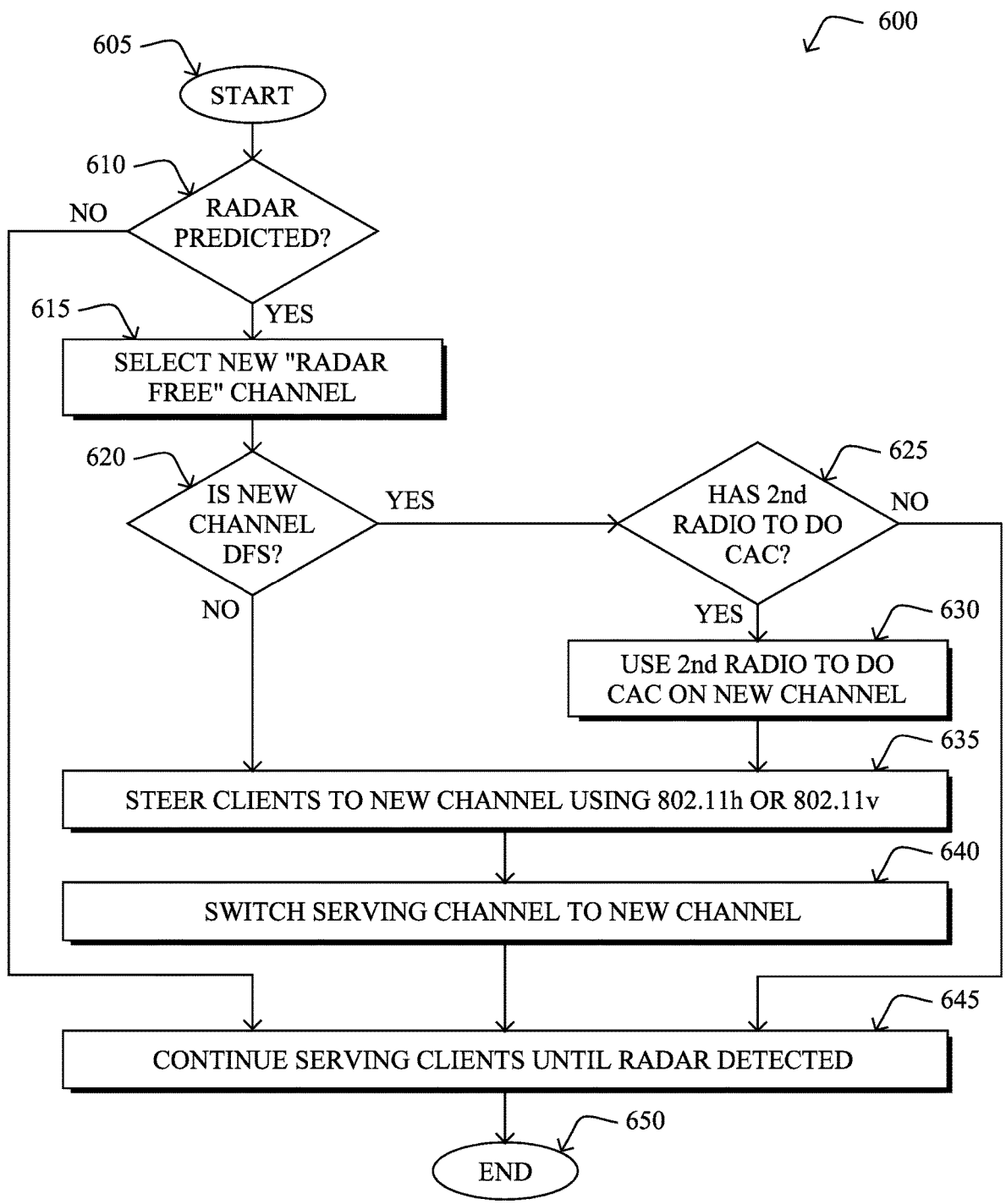
FIG. 6 illustrates an example simplified procedure for scheduling a channel change by an access point.

FIG. 6 shows an example simplified procedure 600 illustrating the proactive channel changing operation of the techniques herein. As shown, procedure 600 may start at step 605 and continues on to step 610 where the channel optimization service (e.g., service 500) determines whether radar usage of the AP's channel is predicted. If not, procedure 600 may proceed on to step 645 where the AP may continue to service its clients on its current channel, until or unless radar usage is detected on that channel. However, if radar usage of the AP's channel is predicted, procedure 600 may instead move on to step 615 in which a new channel may be selected.

In various cases, the channel optimization service may, at step 615, use its prediction model to attempt to select a new channel for the AP that is not predicted to experience radar usage (e.g., a "radar free channel"). If this newly selected channel is not a DFS channel, as determined in step 615, procedure 600 may continue on to step 635, where the AP steers its clients to the new channel, such as by using an 802.11h or 802.11v mechanism. However, if the new channel selected by the service is also a DFS channel, as determined in step 615, procedure 600 may continue on to step 625.

At step 625, a decision may be made as to whether the AP is equipped with a second radio resource, which can even be receive-only, to perform a CAC on the new channel. This allows the AP to perform the CAC on the new, target channel with the second radio resource, while still continuing to service its clients on its other radio. Since the decision to vacate the channel (with upcoming radar interference) is made preemptively using the radar predictions, the client-serving radio can afford to wait for the other radio resource to perform the CAC before changing to the new channel. In this way, no service interruption occurs as the client-serving radio does not need to be taken out of service to perform the CAC.

If the AP is not equipped with a second radio resource, procedure 600 may simply continue on to step 645 and the AP may continue to use its current channel until actual radar interference is detected. However, if the AP has a second radio resource, procedure 600 may continue on to step 630, where the AP uses its second radio resource to perform the CAC on the target channel.

Assuming that the target channel is clear of radar use from the CAC performed in step 630, procedure 600 may continue on to step 635 and the AP may signal its clients, to steer them to the new, target channel (e.g., using 802.11h channel switch announcement). At step 635, to reduce occurrences of disruptive channel changes to clients that do not support 802.11h channel switch announcements, while a scheduled channel change is pending, the AP can steer associated non-802.11h clients to another radio (e.g., using 802.11v or other methods) and temporarily prevent new ones from associating to the AP's radio, allowing them to associate to a different radio.

Following step 635, procedure 600 may move on to step 640, where the AP itself changes channels to the new channel. The AP may then continue to service the clients on the new channel, as in step 645, until it detects radar interference on the new channel. From step 645, procedure 600 then ends at step 650. As would be appreciated, from step 645, procedure 600 may start over again from step 605.

Referring again to FIGS. 5A-5F, another mode of operation allows for the techniques herein to aid in on-demand channel changes that result from actual usage of a wireless channel by radar. While the proactive channel changing described above can be used to greatly reduce the potential for radar interference, the second mode of operation can also be used for purposes of new channel selection, in the cases in which actual radar interference is detected. In particular, if an AP's client-serving radio detects radar interference on its channel, it must move to a new channel within a few seconds. Traditionally, if the new channel is a DFS channel (thus requiring a CAC) the client-serving radio must be taken out of service to perform the CAC. Even if another radio resource is available, there is not enough time for it to perform the CAC on behalf of the client-serving radio, before the client-serving radio must vacate its channel. This service downtime can be prevented, using the predicted channel usages by radar, as shown in FIGS. 5C-5F.

Figure 5C:
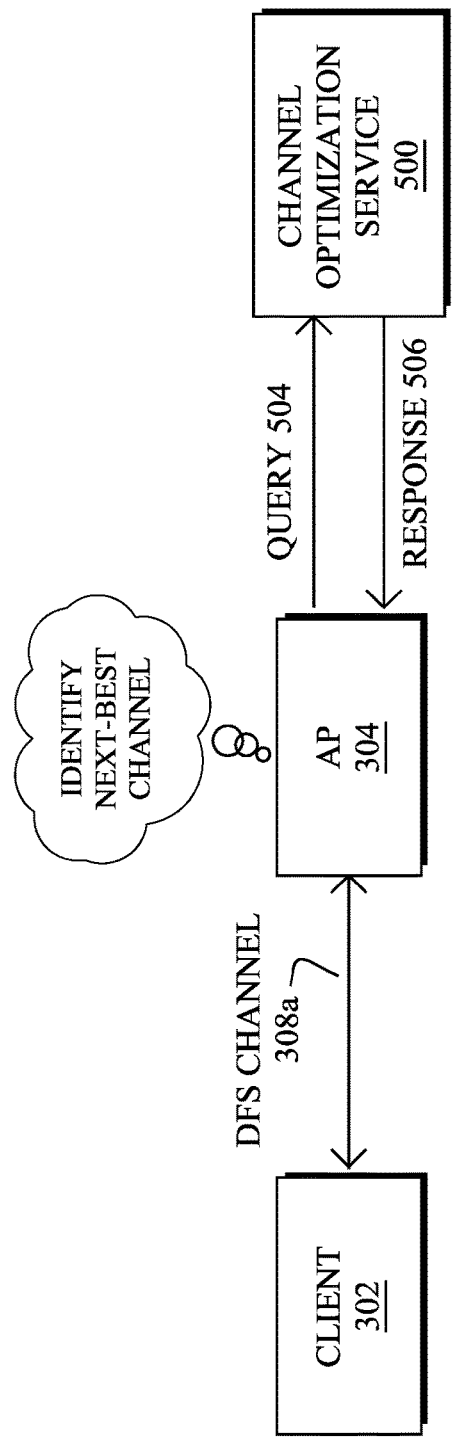

As shown in FIG. 5C, AP 304 may query channel optimization service 500 with query 504 for the next-best channel that is predicted to be radar free for a period of time. In response, channel optimization service 500 may provide an indication of this channel to AP 304 in response 506. In other embodiments, such information may be provided to AP 304 on a push basis, instead. Doing so allows AP 304 to know, in advance of detecting actual radar interference on its current channel 308*a*, what its next-best channel is.

Figure 5D:
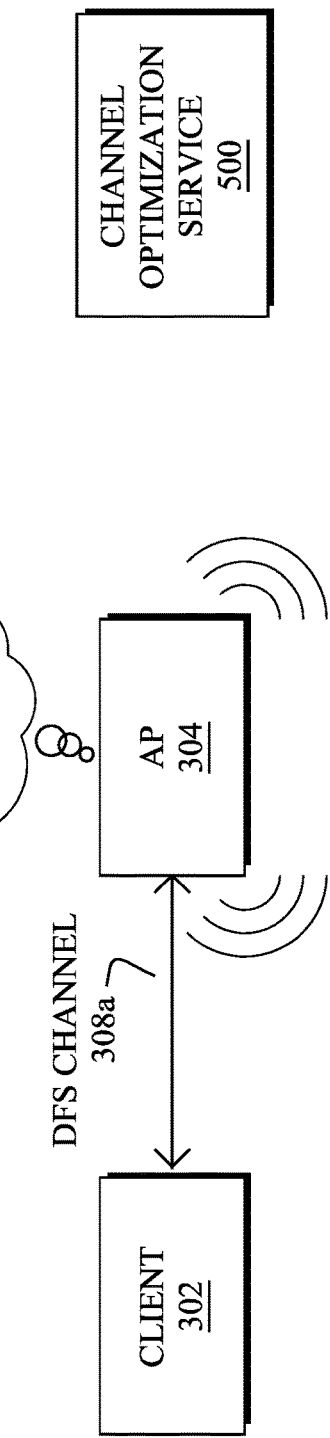

As shown in FIG. 5D, if the next-best channel for AP 304 is a DFS channel, an additional radio resource, which can even be receive-only, of AP 304 can continuously perform a CAC on this next-best channel. In many jurisdictions, this must be performed continuously, because DFS regulations do not allow a stale CAC to be used. Otherwise, if the next-best channel is not a DFS channel, no CAC is needed to prepare AP 304 to switch over to the new channel.

Figure 5E:
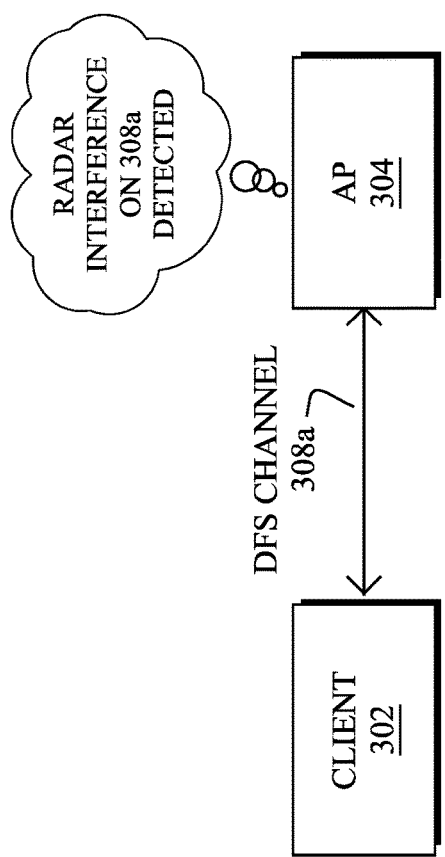
Figure 5F:
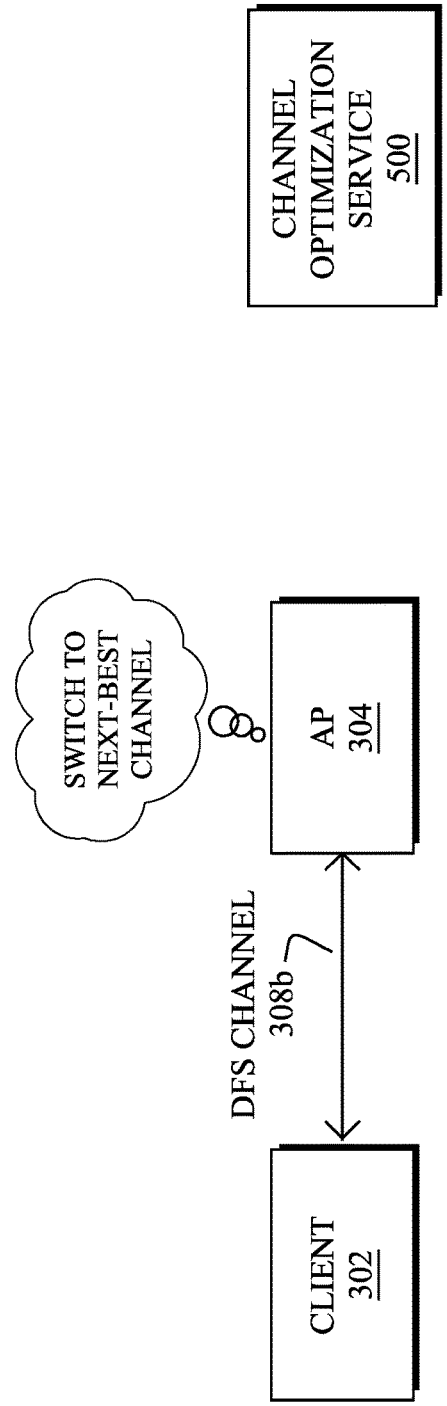

In FIG. 5E, assume now that AP 304 detects radar interference on channel 308*a*, which it is currently using to communicate with client 302. In such a case, as shown in FIG. 5F, AP 304 can immediately switch over to the next-best channel (e.g., channel 308*b*), which has been predicted to be clear of radar use for a period of time and, if a DFS channel, has been recently tested to be clear (assuming no radar was detected) by AP 304 through performance of a CAC from the additional radio resource. Thus, AP 304 experiences no service downtime because its client-serving radio does not need to perform a CAC before switching to the next-best channel. Note that this mechanism can be used in conjunction with the proactive channel changing mechanism (e.g., as a failsafe) or, in other embodiments, as a stand-alone mechanism.

Figure 7:
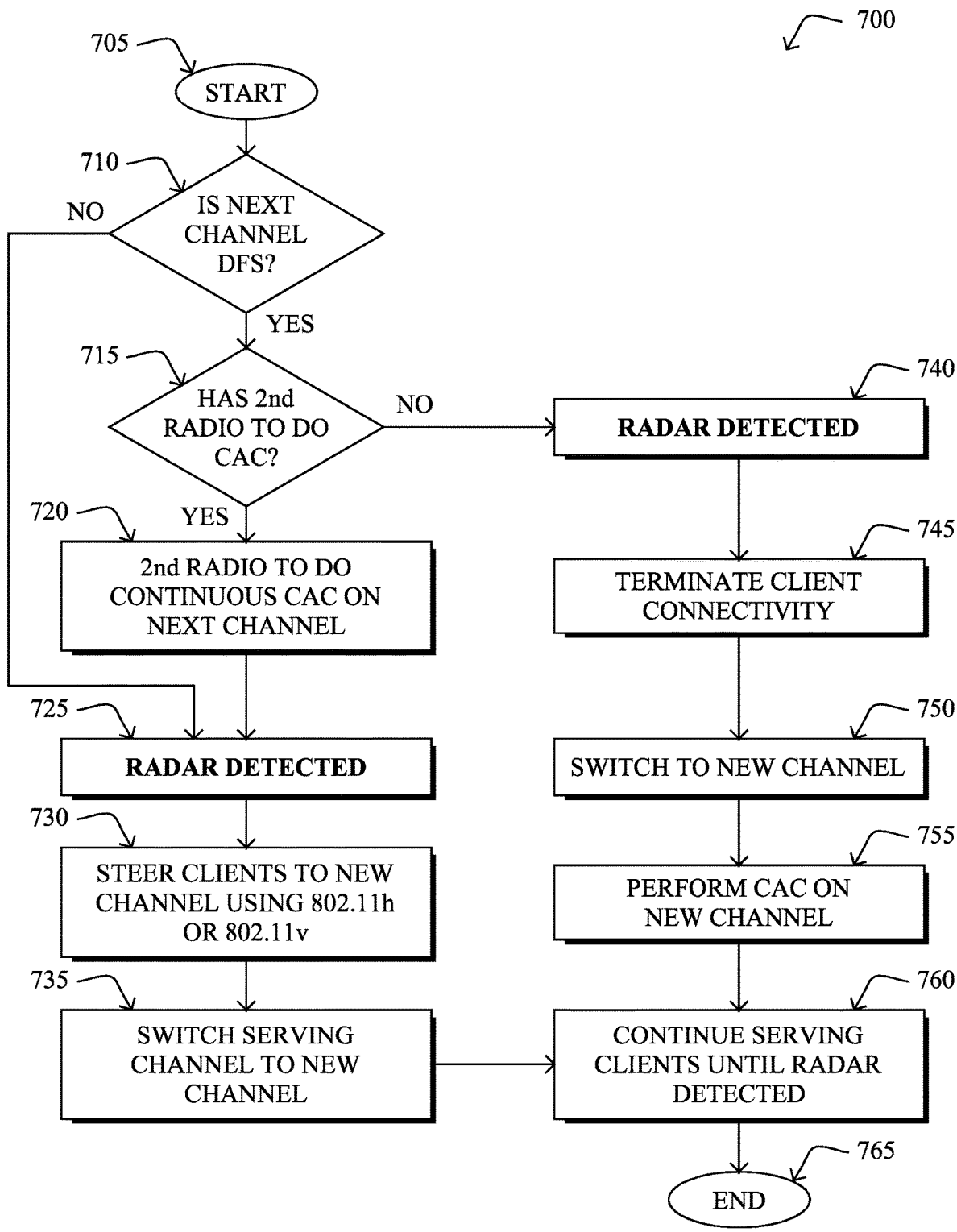
FIG. 7 illustrates an example simplified procedure for predicting a next-best channel for use by an AP.

FIG. 7 illustrates an example simplified procedure 700 for predicting a next-best channel for use by an AP, according to various embodiments. In particular, procedure 700 describes the above next-best channel prediction mechanism in greater detail. As shown, procedure 700 starts at step 705 and continues on to step 710 where a decision is made as to whether the next-best channel for the AP is a DFS channel. As noted, the concept of next-best may encompass the prediction by the channel optimization service that this channel will be free from radar use for a period of time and may include other factors, as well.

If, at step 710, it is determined that the next-best channel for the AP is not a DFS channel, procedure 700 may continue on to step 725 where the AP may continue to use its current channel until detecting radar usage on that channel. When the AP detects radar interference, at step 730, the AP may then steer its clients to its next-best channel and then switch over to the new channel, at step 735. Then, the AP may continue to serve its clients on that new channel unless or until radar usage is detected on that channel, at step 760, and procedure 700 ends at step 765. As would be appreciated, from step 760, procedure 700 may start over again from step 705.

However, at step 710, if it is determined that the next-best channel for the AP is a DFS channel, steps may be taken to ensure that a CAC is performed prior to switching the AP to the new channel. Notably, at step 715, another decision may be made as to whether the AP is equipped with a secondary radio resource, which can even be receive-only, that can perform CACs on the next-best channel. If so, procedure 700 may continue on to step 720 where the AP uses the secondary radio resource to continually perform a CAC on the next-best channel, until the AP detects radar usage on its current channel in step 725. From there, assuming the next-best channel CAC was successful with no radar detected, procedure 700 may continue on as described previously, through steps 730, 735, 760, and 765.

If, at step 715, the AP does not have a secondary radio resource available to do a CAC on the next-best channel, procedure 700 may continue on to step 740, where it detects radar interference on its current channel. Since it was not able to perform a CAC on its next-best channel beforehand, it may terminate its client connectivity, in step 745. As would be appreciated, step 745 may be an implicit effect resulting from the service downtime caused by subsequent steps 750 and 755. Then, the AP may switch to the new channel, at step 750, and perform a CAC on the new channel (with its client-serving radio), at step 755. In turn, assuming the new channel is clear of radar interference throughout the CAC period, the AP may use this new channel to service clients, as in step 760, until radar interference is detected, and procedure 700 ends at step 765. As would be appreciated, from step 760, procedure 700 may start over again from step 705.

Figure 8:
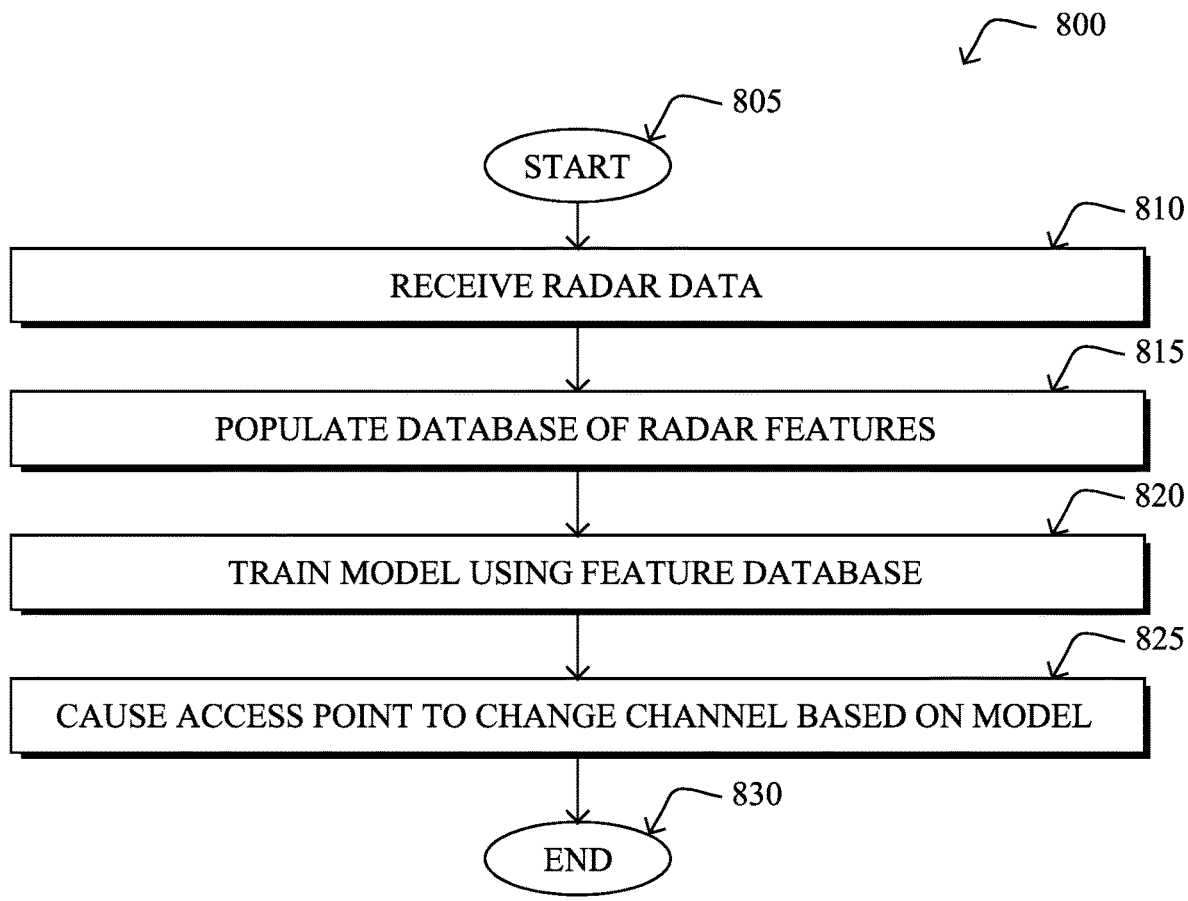
FIG. 8 illustrates an example simplified procedure for implementing radar shield client assurance in a wireless network.

FIG. 8 illustrates an example simplified procedure 800 for implementing radar shield client assurance in a wireless network, in accordance with one or more embodiments described herein. For example, a non-generic, specifically configured device (e.g., device 200) may perform procedure 800 by executing stored instructions (e.g., process 248), to provide a channel optimization service in the network. The procedure 800 may start at step 805, and continues to step 810, where, as described in greater detail above, the service may receive radar data regarding usage of one or more wireless channels by a radar. Such data may be generated, for example, by one or more APs in the wireless network through detection of actual radar signals or through performance of CACs.

In general, the received radar data may indicate the channel on which the usage was detected, the location of the detecting AP or other device, the time of detection, the duration of the channel usage by the radar, weather information for the location of the detecting device, or any other information. In some embodiments, the service may correlate such detections across multiple APs or other detectors, to identify false positives.

At step 815, as detailed above, the service may populate a database of radar features with the received radar data. For example, the database may indicate when, where, and on what wireless channel, radar usage was detected. In some cases, the service may also populate the database by instructing one or more of the APs to perform CACs (e.g., on their secondary radios), to gather data points that may be missing from the database. While CACs from other APs cannot be relied on for purposes of clearing an AP to switch to a given DFS channel, the information obtained from a CAC can still be used for purposes of predicting which channels will experience radar usage and when.

At step 820, the service may use the populated database of radar features to train a machine learning-based model to predict channel usages by the radar, as described in greater detail above. In various embodiments, such a model may be a logistic regression-based model or a (k-)nearest neighbor-based model. In a simplistic example, if radar usage is detected at a given location on Wi-Fi channel 124 each day at 3:00 PM, the model may predict that channel 124 is also likely to experience radar usage at 3:00 PM on subsequent days, as well.

At step 825, as detailed above, the service may cause a wireless AP to change to a different wireless channel, based on the predicted channel usages by the radar. In some embodiments, the service may do so proactively, by instructing the AP to change channels in advance of the predicted time at which radar usage is expected on its current channel, while avoiding CAC service downtime. In other embodiments, the service may notify the AP of its next-best channel that is predicted to be clear from radar use. In turn, the AP may use this information to continuously perform CACs on the next-best channel, thereby preparing the AP in advance to immediately switch over to the next-best channel on demand. Procedure 800 then ends at step 830.

It should be noted that while certain steps within procedures 600-800 may be optional as described above, the steps shown in FIGS. 6-8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 600-800 are described separately, certain steps from each procedure may be incorporated into each other procedure, and the procedures are not meant to be mutually exclusive.

The techniques described herein, therefore, can be used to eliminate DFS-related losses of service in many networks. In some aspects, the techniques can be used to predict whether the current channel in use by an AP will experience radar interference and, if so, proactively cause the AP to switch channels, while avoiding CAC service downtime. In further aspects, the techniques herein can be used to identify a next-best channel for an AP that is predicted to be clear from radar usage, at least for a period of time. This allows the AP to continuously perform CACs on the next-best channel, enabling the AP to switch over to the next-best channel immediately, if it encounters radar interference on its current channel.

While there have been shown and described illustrative embodiments that provide for radar shield assurance in wireless networks, it is to be understood that various other adaptations and modifications may be made within the spirit and scope of the embodiments herein. For example, while certain embodiments are described herein with respect to using certain models for purposes of channel usage predictions, the models are not limited as such and may be used for other functions, in other embodiments. In addition, while certain protocols are shown, such as Wi-Fi, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   receiving, at a service, radar data regarding usage of one or more wireless channels by a radar;
   populating, by the service, a database of radar features with the received radar data;
   training, by the service and using the database of radar features, a machine learning-based model to predict channel usages by the radar;
   using, by the service, the machine learning-based model to predict a time at which the radar will begin using a dynamic frequency selection (DFS) channel in use by a wireless access point;
   instructing, by the service, the wireless access point using a second antenna, to perform a channel availability check (CAC) for the presence of radar signals for a period of time on a second DFS channel; and
   causing, by the service, the wireless access point to change to the second DFS channel, based on the predicted channel usages by the radar and the CAC to avoid DFS channel change service downtime.

2. The method as in claim 1, wherein the received radar data comprises a particular wireless channel on which the radar was detected and at least one of: a time or location at which usage of the particular wireless channel by the radar was detected.

3. The method as in claim 1, further comprising:
   determining, by the service, whether a detection by a first access point of the radar using a particular wireless channel was a false positive by comparing radar data received from a plurality of access points.

4. The method as in claim 1, wherein the machine learning-based model comprises a logistic regression-based classifier or a nearest neighbor-based classifier.

5. The method as in claim 1, wherein causing the wireless access point to change to the second DFS channel, based on the predicted channel usages by the radar, comprises:
   notifying the access point of at least one of the wireless channels that is predicted to be clear from use by the radar.

6. The method as in claim 1, wherein the wireless channels comprise 5 GHz Wi-Fi channels.

7. The method as in claim 1, wherein the service is hosted by the access point or by a wireless local area network controller (WLC) that oversees the access point.

8. An apparatus comprising:
   one or more network interfaces to communicate with a network;
   a processor coupled to the network interfaces and configured to execute one or more processes; and
   a memory configured to store a process executable by the processor, the process when executed configured to:
   receive radar data regarding usage of one or more wireless channels by a radar;
   populate a database of radar features with the received radar data;
   train, using the database of radar features, a machine learning-based model to predict channel usages by the radar;
   use the machine learning-based model to predict a time at which the radar will begin using a dynamic frequency selection (DFS) channel in use by a wireless access point;
   instruct the wireless access point using a second antenna, to perform a channel availability check (CAC) for the presence of radar signals for a period of time on a second DFS channel; and
   cause the wireless access point to change to the second DFS channel in advance of the predicted time based on the predicted channel usages by the radar and the CAC to avoid DFS channel change service downtime.

9. The apparatus as in claim 8, wherein the received radar data comprises a particular wireless channel on which the radar was detected and at least one of: a time or location at which usage of the particular wireless channel by the radar was detected.

10. The apparatus as in claim 8, wherein the process when executed is further configured to:
    determine whether a detection by a first access point of the radar using a particular wireless channel was a false positive by comparing radar data received from a plurality of access points.

11. The apparatus as in claim 8, wherein the machine learning-based model comprises a logistic regression-based classifier or a nearest neighbor-based classifier.

12. The apparatus as in claim 8, wherein the apparatus causes the wireless access point to change to the second DFS channel, based on the predicted channel usages by the radar, by:
    notifying the access point of at least one of the wireless channels that is predicted to be clear from use by the radar.

13. The apparatus as in claim 8, wherein the access point uses a second antenna to perform a channel availability check (CAC) before changing channels.

14. The apparatus as in claim 8, wherein the apparatus comprises the access point or a wireless local area network controller (WLC) that oversees the access point.

15. A tangible, non-transitory, computer-readable medium storing program instructions that cause a service in a network to execute a process comprising:
    receiving, at the service, radar data regarding usage of one or more wireless channels by a radar;
    populating, by the service, a database of radar features with the received radar data;
    training, by the service and using the database of radar features, a machine learning-based model to predict channel usages by the radar;
    using, by the service, the machine learning-based model to predict a time at which the radar will begin using a dynamic frequency selection (DFS) channel in use by a wireless access point;
    instructing, by the service, the wireless access point using a second antenna, to perform a channel availability check (CAC) for the presence of radar signals for a period of time on a second DFS channel; and
    causing, by the service, the wireless access point to change to the second DFS channel, based on the predicted channel usages by the radar and the CAC to avoid DFS channel change service downtime.

* * * * *

UNITED STATES PATENT AND TRADEMARK OFFICE
CERTIFICATE OF CORRECTION

PATENT NO. : 10,743,226 B2  
APPLICATION NO. : 15/891488  
DATED : August 11, 2020  
INVENTOR(S) : Benjamin Jacob Cizdziel et al.

Page 1 of 1

It is certified that error appears in the above-identified patent and that said Letters Patent is hereby corrected as shown below:

In the Specification

Column 2, Line 53, please amend as shown:
(PE) routers 120 (e.g., PE-1, PE-2, and PE-3) in order to Signed and Sealed this  
Fifteenth Day of December, 2020

Andrei Iancu  
*Director of the United States Patent and Trademark Office*